F. W. REILLY.
T-SQUARE.
APPLICATION FILED MAY 24, 1913.
1,242,722.
Patented Oct. 9, 1917.
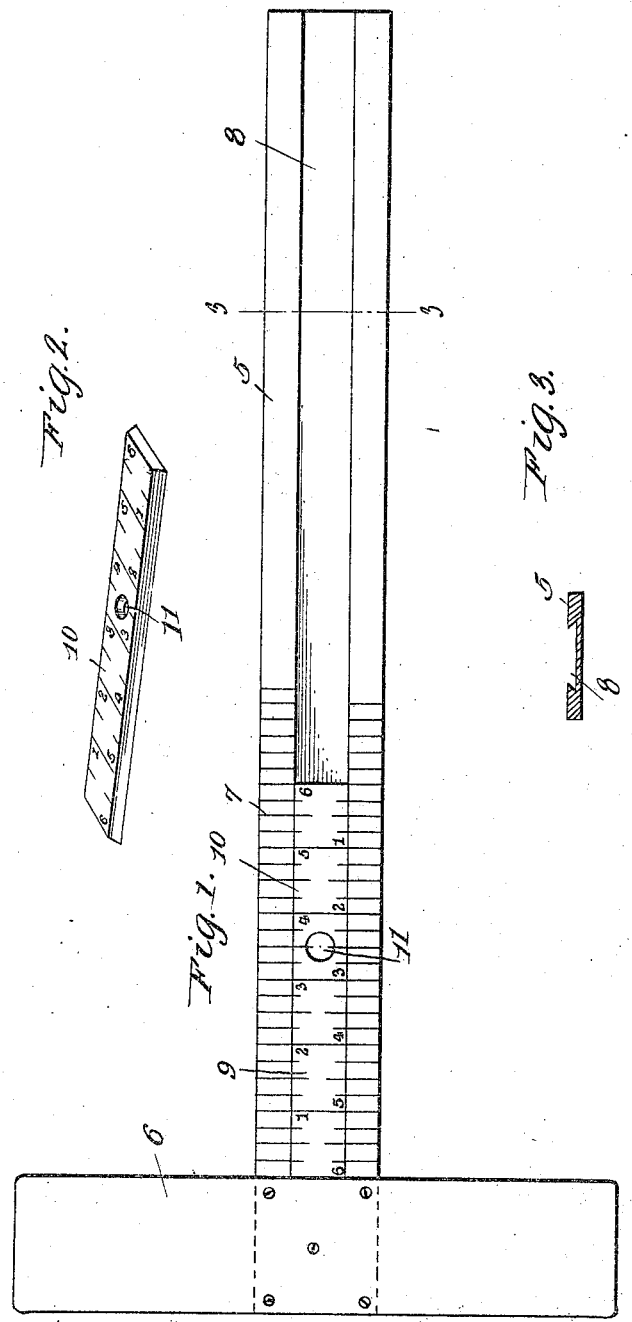

UNITED STATES PATENT OFFICE.

FRANK W. REILLY, OF SANDWICH, MASSACHUSETTS.

T-SQUARE.

1,242,722.  Specification of Letters Patent.  Patented Oct. 9, 1917.

Application filed May 24, 1913. Serial No. 769,686.

*To all whom it may concern:*

Be it known that I, FRANK W. REILLY, citizen of the United States, residing at Sandwich, in the county of Barnstable and State of Massachusetts, have invented certain new and useful Improvements in T-Squares, of which the following is a specification.

This invention relates to measuring instruments and more particularly to novel and useful improvements in T squares.

An object of this invention is the provision of a T square which is provided with graduation marks at predetermined intervals thereon and has associated therewith a suitable scale bar which alines with the graduations of the T square for ascertaining various dimensions, thereby eliminating the use of additional instruments.

Other objects as well as the nature, characteristic features and scope of my invention will be more readily understood from the following description taken in connection with the accompanying drawings and pointed out in the claim forming a part of this specification.

Referring to the drawings:—

Figure 1 is a top plan view of the device constructed in accordance with my invention;

Fig. 2 is a detail perspective view of the scale bar; and

Fig. 3 is a transverse sectional view taken on the line 3—3 of Fig. 1.

In the drawings wherein is shown the preferred form of my invention the numeral 5 represents the arm of the T square and the numeral 6 the head or cross piece thereof. Said cross piece is secured to the arm in the ordinary manner. The arm 5 is provided with graduation marks 7 arranged at predetermined intervals thereon, the marks being arranged along the longitudinal edges of the arm as shown to advantage in Fig. 1. A longitudinal dove-tailed groove 8 is formed in the arm 5 and extends through the longitudinal center of the same so that the rule or scale bar 9 which is slidably mounted therein, may be used to advantage with the graduations along the longitudinal edges of the said arm. The scale bar 9 is provided with graduations 10 conforming to the graduations along longitudinal edges of the arm 5 and may be arranged thereon to a fraction of an inch as desired. The graduations 10 are arranged along the longitudinal edges of the bar 9 and are adapted to register with the graduations which are formed on the arm 5. On reference to Fig. 1 it will be seen that the graduation marks are arranged a quarter of an inch apart from each other, this being simply for the sake of properly illustrating my device, as it is to be understood that the graduations on both the arm 5 and the scale bar 9 are to be arranged to the minutest fraction of an inch so as to be advantageously used with drafting of any kind. An aperture 11 is formed approximately midway the ends of the bar 9 and is provided so as to facilitate the operation of the scale bar in the arm 5, as it is obvious that the finger of the operator can be inserted in the aperture so as to slide the bar to a predetermined point.

From the above description it is obvious that I have provided a simple and efficient device which will be advantageously used with T squares, and will eliminate the use of rulers or the like which have heretofore been used for obtaining various dimensions and which have been found to be undesirable in this art for many reasons. The associating of my improved device with T squares now in use will in no way complicate the same and the cost of manufacture will be practically the same.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

The uses of my invention are unlimited but one of the uses to which it may very advantageously be applied is as follows. We will assume that in the determination of a point or points on a sheet of paper the draftsman finds it necessary to draw a line of a predetermined length starting at a predetermined distance from the edge of the paper. With the T-square as at present employed, it would be necessary for him to place the T-square on the paper and by tedious uses of a rule reach the result, whereas with the use of my invention the T-square is simply placed on the drawing in its usual manner. I will assume for the present instance that the edge of the paper falls in alinement with the graduation marked 1 on the face of the T-square. I will also assume that the distance from the one inch mark to the starting point of line which it is desired to draw is three inches from the edge of the paper and that the line is to be three inches in length. The slidable rule 9 will now be moved until the zero end thereof, in this instance the left end, coincides with the four inch mark on the graduations of the T-square proper. The draftsman will now mark off the length of the line by the graduations on the slidable rule 9 and will thereby obtain the starting point of the line and its length. Very accurate calculations can be carried on in this manner by my improved device and while I have referred to the graduations as in inches, these graduations may be as minute as is desired. Lines drawn on the opposite edges of the T-square may be drawn in the same manner, and lines which it is desired to start or draw from a point adjacent the opposite edge of the paper can be facilitated by the second set of graduations carried by the rule.

Having thus fully described my invention, what I claim as new and desire to secure by Letters Patent is:—

A T-square comprising a blade with a longitudinal dove-tailed groove in the upper surface, there being graduations on the blade at each side of the groove, the graduations registering mutually and extending to the edges of the blade, and a scale bar disposed in the groove, the scale bar having a finger hole whereby the bar may be moved, the scale bar being provided with graduations arranged thereacross, to register with the blade graduations so that the graduations on the blade and the bar may be continuous from one edge of the blade to the other.

In testimony whereof I affix my signature in presence of two witnesses.

FRANK W. REILLY.

Witnesses:
JOHN F. KELLEHER,
CHARLES A. McCORMICK.

Copies of this patent may be obtained for five cents each, by addressing the "Commissioner of Patents Washington, D. C."